United States Patent
Kobayashi

(10) Patent No.: US 6,199,122 B1
(45) Date of Patent: Mar. 6, 2001

(54) COMPUTER SYSTEM, EXTERNAL STORAGE, CONVERTER SYSTEM, AND RECORDING MEDIUM FOR CONVERTING A SERIAL COMMAND AND DATA STANDARD TO A PARALLEL ONE

(75) Inventor: Toshiya Kobayashi, Koshigaya (JP)

(73) Assignee: Tokyo Electron Device Limited, Yokohama (JP)

(*) Notice: Subject to any disclaimer, the term of this patent is extended or adjusted under 35 U.S.C. 154(b) by 0 days.

(21) Appl. No.: 09/120,326

(22) Filed: Jul. 22, 1998

(30) Foreign Application Priority Data

Aug. 1, 1997 (JP) .................................................. 9-208164

(51) Int. Cl.[7] ............................. G06F 13/14; G06F 13/20
(52) U.S. Cl. ......................... 710/36; 714/724; 371/22.1; 371/22.3; 371/22.5; 371/22.6; 709/214; 709/250
(58) Field of Search .......................... 714/724; 371/22.1, 371/22.3, 22.5, 22.6; 709/250, 214; 710/36

(56) References Cited

U.S. PATENT DOCUMENTS

| 5,276,802 | * | 1/1994 | Yamaguchi et al. | 395/164 |
|---|---|---|---|---|
| 5,726,768 | * | 3/1998 | Ishikawa et al. | 358/442 |
| 5,768,147 | * | 6/1998 | Young | 364/492 |
| 6,055,656 | * | 4/2000 | Wilson, Jr. et al. | 714/724 |
| 6,070,196 | * | 5/2000 | Mullen, Jr. | 709/250 |

FOREIGN PATENT DOCUMENTS

| 59-20086 | | 2/1984 | (JP) . | |
|---|---|---|---|---|
| 402109426A | * | 4/1990 | (JP) | H03M/11/04 |
| 7-334316 | | 12/1995 | (JP) . | |
| 08166919A | * | 6/1996 | (JP) | G06F/13/12 |
| 8-227359 | | 9/1996 | (JP) . | |
| 8-286925 | | 11/1996 | (JP) . | |
| 8-287195 | | 11/1996 | (JP) . | |
| 11284684A | * | 10/1999 | (JP) | H04L/29/06 |

* cited by examiner

Primary Examiner—Thomas C. Lee
Assistant Examiner—Rehana Perveen
(74) Attorney, Agent, or Firm—Oblon, Spivak, McClelland, Maier & Neustadt, P.C.

(57) ABSTRACT

In order to access a memory card of the ATA specification, a computer generates a command based on the USB. A conversion controller in a reader/writer receives the command and converts it into a command of the ATA specification and supplies it to a controller of the ATA specification. The controller accesses the memory card based on the command of the ATA specification thus supplied. The conversion controller converts the formats of the data of the USB specification and the data of the ATA specification to each other. Consequently, the computer can access the memory card of the ATA specification constituting a conventional standard product using the USB of serial communication smaller in the area occupied by the connector.

20 Claims, 10 Drawing Sheets

COMPUTER SYSTEM, EXTERNAL STORAGE, CONVERTER SYSTEM, AND RECORDING MEDIUM FOR CONVERTING A SERIAL COMMAND AND DATA STANDARD TO A PARALLEL ONE

BACKGROUND OF THE INVENTION

The present invention relates to a serial interface technique for a computer, particularly a technique for making the conventional external memory device of the ATA standard accessible with a command of the USB standard.

A floppy disk drive, a hard disk drive, etc. based on the ATA (AT Attachment) standard are known as conventional external memory devices. These memory devices pose the problem that they easily succumb to an external magnetism and the recorded data are liable to be lost. Also, these memory devices encounter the problem that they cannot be used for a portable terminal such as the PDA (Personal Data Assistance) operated by battery due to a large power consumption.

In order to solve these problems, a technique finds practical applications for recording and reproducing data by handling a memory card using a non-volatile memory such as a flash memory in the same way as the magnetic disk drive.

The conventional external memory device, which operates through a SCSI (Small Computer Serial Interface) constituting a parallel interface, has many pins for a connector. The connector is thus increased in size thereby making it difficult to secure the arrangement location of the connectors of the terminal and the external memory device.

It is considered to solve this problem by sending a command in a serial form from a computer, and processing the command by converting it into a parallel form within the external device. For example, a command based on SCSI is transmitted in a serial form and converted into a parallel form in the external memory device. However, in this case, the computer must process the command in a method different from the existing ones. The solution, therefore, is not practical.

On the other hand, a serial interface of the USB (Universal Serial Bus) standard has recently been proposed. A computer having an input/output port conforming with this standard is also in practical use. By using this standard input/output, data can be stored in and read from an external memory device at high speed. Therefore, data transmission and receipt to and from these cards using USB is expected. Since the command system and the protocol are quite different between USB and SCSI, however, the problem encountered is that the external memory device conforming with the SCSI constituting the conventional hardware and software resources cannot be used.

Also, there is another problem that the supplier of the external memory device must provide two types of system including SCSI and USB.

The above problem is not limited to the external memory device, and a similar problem arises when the communication is to be established between a computer and peripheral equipment thereof.

BRIEF SUMMARY OF THE INVENTION

An object of the present invention is to provide a system and a method by which a high-speed communication is made possible between a computer and peripheral equipment while minimizing the area occupied by the terminals on the computer and using the existing resources effectively.

Another object of the invention is to provide a technique by which the peripheral equipment can be controlled by a command based on the USB standard while maintaining the compatibility with the existing resources.

Still another object of the invention is to provide multipurpose peripheral equipment.

According to a first aspect of the invention, there is provided a computer system comprising a computer including a computer-side serial interface for issuing a command based on the serial communication standard through the serial interface, a storage medium, a storage-side serial interface connected to the computer-side serial interface, and a converter for converting a command based on the serial communication standard supplied serially through the computer-side serial interface and the memory-side serial interface into a corresponding parallel command based on the parallel communication standard, and an external storage including an access section for controlling the access to the storage medium based on the parallel command supplied from the converter.

With this configuration, the computer establishes the communication through the serial interface. As compared with the case using a parallel interface, therefore, the terminal area can be reduced and thus the area occupied by the connector on the system can be reduced.

Also, the external storage is based on the parallel communication standard, and by converting a command based on the serial communication standard into a command based on the parallel communication command, the existing normal external storage can be directly accessed thereby maintaining the compatibility with the existing system.

The computer is not limited to the desktop computer or notebook-sized computer, but generally includes all computers for processing data by accessing the external storage of a PDA (Personal Data Assistance), a palmtop computer, a digital still camera, a portable telephone or the like.

The computer issues a command based on the USB (Universal Serial Bus) standard, for example, the converter of the external storage converts a command based on the USB standard into a corresponding parallel command based on the ATA standard, for example, the access section controls the access to the storage medium based on the parallel command supplied from the converter, for example.

The USB is a protocol for carrying out a high-speed serial communication. A high-speed communication becomes possible by complying with this standard. A simple compliance with this communication standard, however, makes it impossible to access the external storage based on the existing ATA standard. In view of this, a command issued by the computer is converted into a command based on the ATA standard and the storage medium is accessed. Consequently, the existing external storage based on the ATA standard can be used.

According to a second aspect of the invention, there is provided a memory device for a computer, comprising a converter configured to be connectable to a serial communication terminal of the computer for converting a command based on a first standard supplied serially from the computer into a parallel command based on a second standard different from the first standard, and an access section for controlling the access to a storage medium according to the parallel command based on the second standard supplied from the converter.

With this configuration, communication is made possible using a serial communication terminal of the computer. As a result, it becomes possible to minimize the area occupied by the connector of the computer. Also, since the command based on the first standard supplied serially is converted into a command based on the second parallel standard, the compatibility is secured with the memory device for controlling the access to the storage medium based on the widely-used parallel command. The computer includes all the ones which access a storage medium and process the data thereof.

The first standard is the USB (Universal Serial Bus) standard, for example, and the second standard is the ATA (AT Attachment), for example. The USB standard is a protocol for high-speed serial communication. By compliance with this standard, high-speed communication becomes possible. Also, substantially all the existing external storages are based on the ATA standard. By converting the command issued by the computer into a command based on the ATA standard and accessing the storage medium, therefore, the compatibility with the existing memory devices can be maintained.

The converter can include one for converting the data format supplied serially based on the first standard from the computer into the parallel data of the format based on the second standard. The access section, on the other hand, can include a write section for writing the data of the format based on the second standard into the storage medium in response to a write command based on the second standard supplied from the converter.

Also, the access section reads the data stored in the recording medium and supplies it to the converter in the format based on the second standard in response to a read command based on the second standard supplied from the converter, and the converter can include a source for converting the data supplied from the access section into the serial data of the format based on the first standard and supplying it to the computer.

This configuration can secure the compatibility of data as well as commands.

As to each command from the computer for which a response can be returned to the computer without using the access section, the converter returns a response to the computer without converting the command into a command based on the second standard. Each command from the computer which requires access to the storage medium by the access section, on the other hand, is converted to a command based on the second standard and supplied to the access section.

The commands supplied from the computer include those commands requiring the processing by the access section and those commands which can be uniquely processed by the converter. This configuration can shorten the response time as the converter directly processes the commands that can be processed thereby.

The system can comprise a mounting member for mounting the storage medium thereon removably so that the storage medium thus mounted may be accessed.

In the process, the access section may access the storage medium arranged fixedly in the memory device and mounted on the mounting member or may be integrally formed with the storage medium and mounted on the mounting member.

Also, the storage medium can include a flash memory and the external storage may function substantially similarly to the magnetic disk drive.

According to a third aspect of the invention, there is provided a converter system comprising a first node based on a serial communication standard, a second node based on a parallel communication standard, a converter for converting a command based on the serial communication standard supplied serially through the first node into a corresponding parallel command based on the parallel communication standard in the case where the particular command requires access to the system based on the parallel communication standard and applying the resulting command to the second node, and a transmitter for transmitting through the first node a response to the command based on the serial communication standard supplied serially through the first node without converting it into a command based on the parallel communication standard in the case where the particular command requires no access to the system.

With this configuration, communication becomes possible between a serial port and a parallel port of different command systems, for example, through the converter system. Also, depending on the type of a particular command, the response time can be shortened since the response to the command is transmitted without converting the command.

The converter can include an output section for converting the format of the data based on the serial communication standard supplied through the first node into the data of the format based on the parallel communication standard, and producing the resulting data to the second node, and an output section for converting the format of the data based on the parallel communication standard supplied through the second node into the data of the format based on the serial communication standard and applying the resulting data to the first node.

This configuration makes possible data communication.

The first node is to be connected to a serial communication terminal based on the serial communication standard of the computer, for example, and the second node is connected to the access section for accessing the storage medium based on the command supplied from the converter, for example.

The second node is connected fixedly to the access section, for example, and the access section is connected to another access section for accessing the storage medium removably mounted. This configuration is applicable to the case in which a controller or the like for accessing the storage medium is provided in the converter system, for example, and a removable recording medium not including the controller is accessed.

Also, the access section can be connected removably to the second node to access the storage medium in the state so connected. This configuration is applicable to the case in which the storage medium is integrated with a controller or the like for accessing the storage medium and connected with the second node for access.

The converter and the transmitter include, for example, a memory for storing a program for converting the command based on the USB standard into the command based on the ATA standard and a program for responding to the command based on the USB standard, and a processor for receiving the command supplied through the first node and executing the program corresponding to the received command thereby to convert or respond to the command.

According to a fourth aspect of the invention, there is provided a medium for recording a program for causing a processor to execute the step of converting a command based on the USB standard into a command based on the ATA standard, the step of responding to the command based on the USB standard, the step of converting the data format based on the USB standard into the data of the format based on the ATA standard and the step of converting the data based on the ATA standard into the data of the format based on the USB standard.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An external storage device according to an embodiment of the invention will be explained below.

First Embodiment

Figure 1:
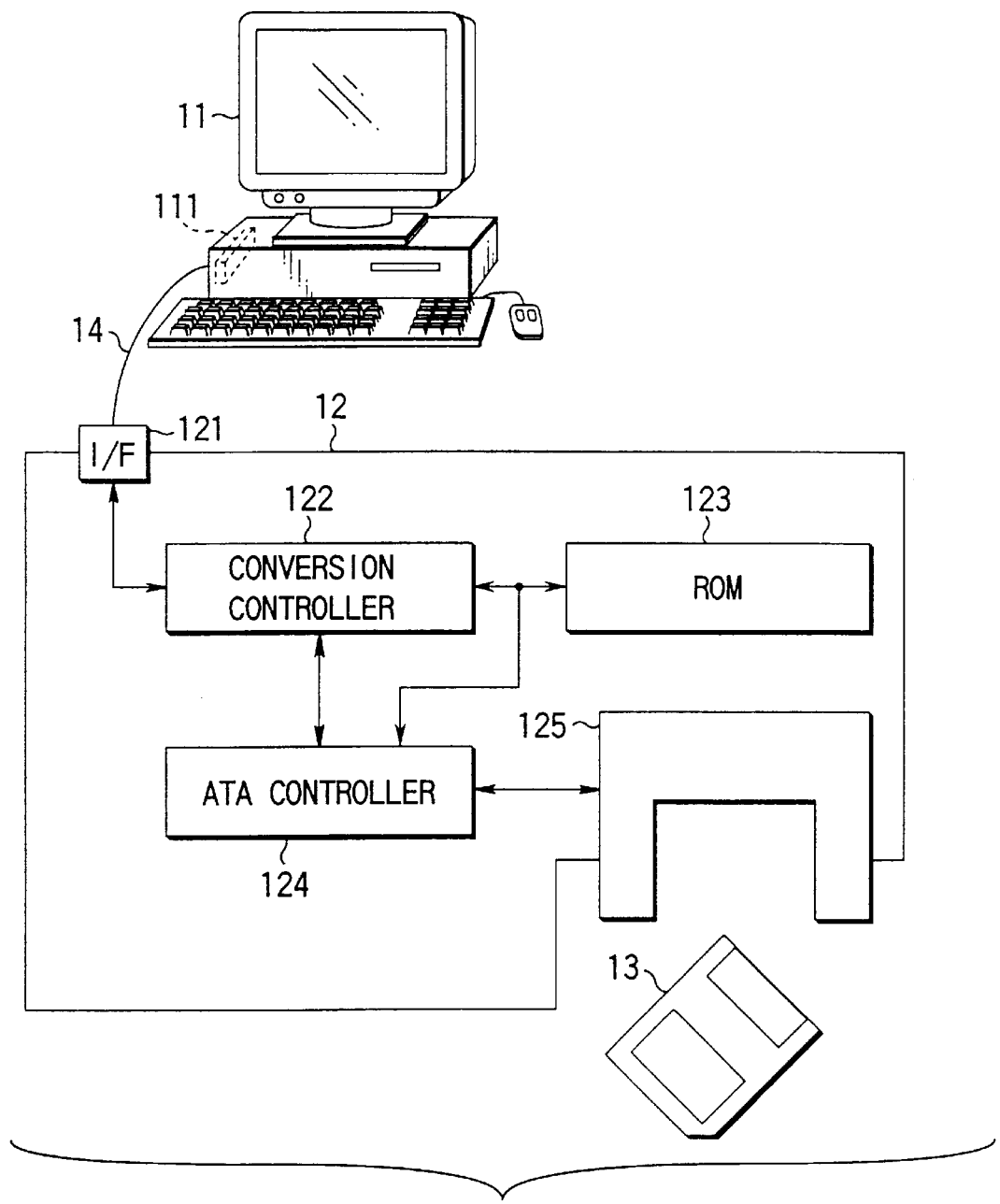
FIG. 1 is a block diagram showing a basic configuration of a computer system according to a first embodiment of the present invention.

FIG. 1 shows a configuration of a computer system according to a first embodiment of the invention.

According to FIG. 1, the computer system comprises a computer 11, a reader/writer (external storage) 12 and a removable memory card 13.

The computer 11 includes a personal computer or the like having a serial interface 111 based on the USB standard. The computer 11 inputs and outputs various commands, control signals and data by way of the USB terminal in order to write, read, erase or otherwise process data with an external storage as a type of disk drive according to an OS (operating system) and a predetermined driving operation.

Figure 2:
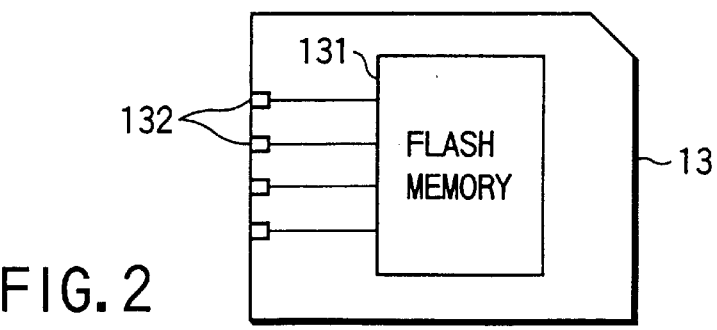
FIG. 2 is a diagram showing a configuration of a memory card.

The memory card 13 includes terminals 132 on the surface thereof as shown in FIG. 2, and an internal flash memory 131 connected to the terminals 132. The memory card 13 functions as what is called a silicon disk or a PC card according to the ATA standard, and stores data and reads, outputs and erases the stored data under an external control.

The reader/writer 12 includes, as shown in FIG. 1, a serial interface (USB interface) 121 based on the USB standard, a conversion controller 122, a ROM 123, an ATA (AT Attachment) controller 124, and a connector 125.

The USB interface 121 is a node connected to the computer 11 for transmitting and receiving data based on the USB standard to and from the computer 11.

The conversion controller 122 is configured of a one-chip microprocessor or the like and operates in accordance with the program stored in the ROM 123. The commands and data based on the USB standard supplied from the computer 11 are converted into the commands and data based on the ATA standard and outputted to the ATA controller 124. The control signals and the data based on the ATA standard supplied from the ATA controller 124, on the other hand, are converted into the control signals and the data based on the USB standard and supplied to the computer 11 through the USB interface 121.

The ROM 123 stores a program, a fixed data or the like for defining the operation of the conversion controller 122, or, for example, a program for converting a command based on the USB standard into a command based on the ATA standard. The commands based on the USB standard include a command required to access the memory card 13 and a command not required to access the memory card 13. As for the command required to access the memory card 13, the ROM 123 stores a program module for converting each command into a corresponding ATA command, while as for the command not required to access the memory card 13, the ROM 123 stores a program module for responding to the particular command.

Also, the ROM 123 stores the program used by the conversion controller 122 to convert the data format based on the USB standard and the data format based on the ATA standard to each other.

The ATA controller 124 is a read/write controller based on the ATA standard and reads/writes data from and into the memory card 13.

The connector 125 is a node for connecting the ATA controller 124 and the memory card 13 to each other, and includes a slot in which the memory card 13 is fitted removably, and a connecting terminal connected to the ATA controller 124 and the terminal 132 of the memory card 13 mounted.

Now, the operation of the computer system configured as described above will be sequentially explained with reference to the flowcharts of FIGS. 3 to 9.

(Activation process)

Figure 3:
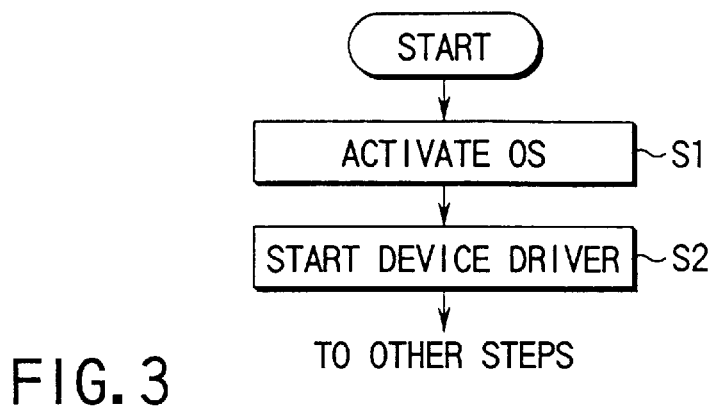
FIG. 3 is a flowchart showing the operation for activating the computer system.

First, upon activation of the computer 11, as shown in FIG. 3, the OS is activated (step S1) first of all. Then, a dedicated device driver is started for accessing the reader/writer 12 under the control of the OS (step S2).

After that, the computer 11 starts other required programs appropriately and transfers to the initialized state.

(Format of memory card 13)

For the computer 11 to use the memory card 13 as an external storage, the memory card 13 is required to be formatted in accordance with the OS standard.

Figure 4:
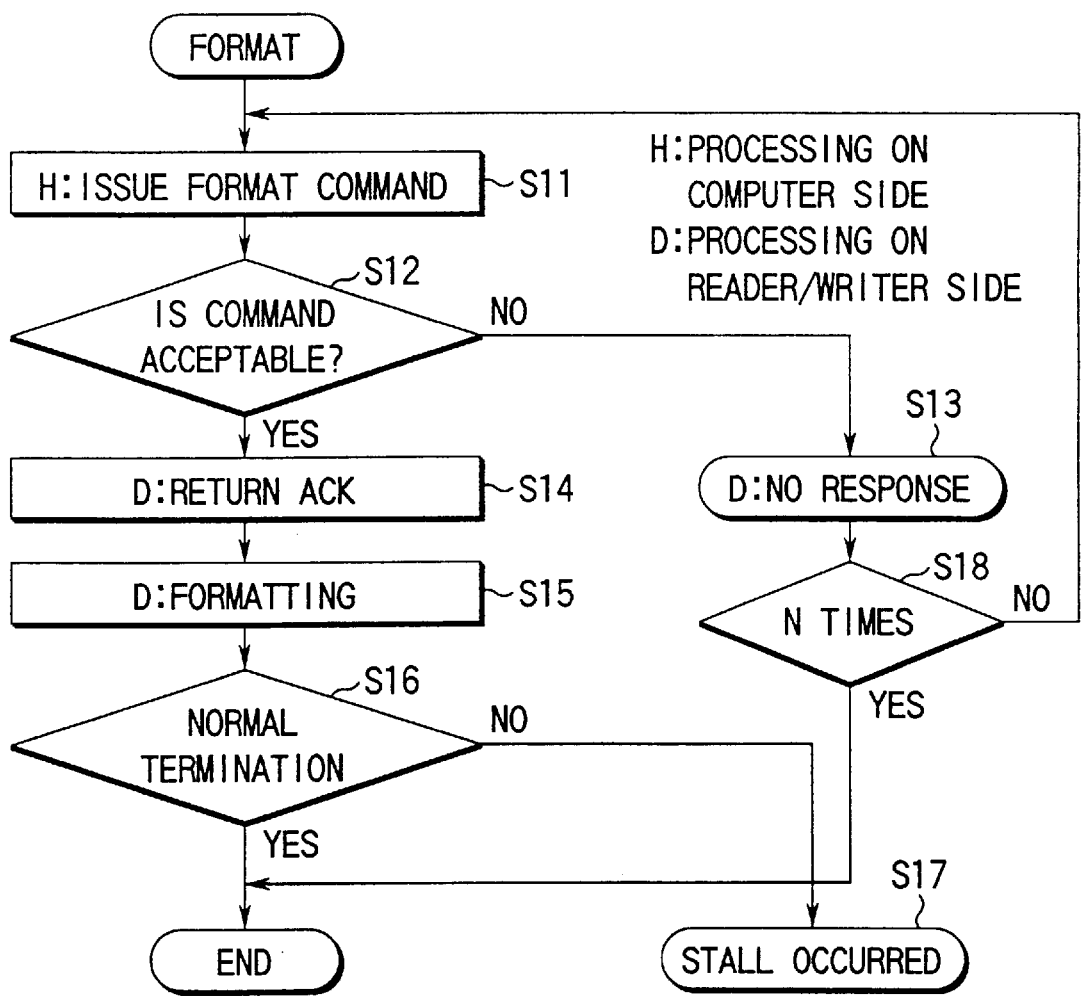
FIG. 4 is a flowchart for explaining the formatting process.
Figure 5:
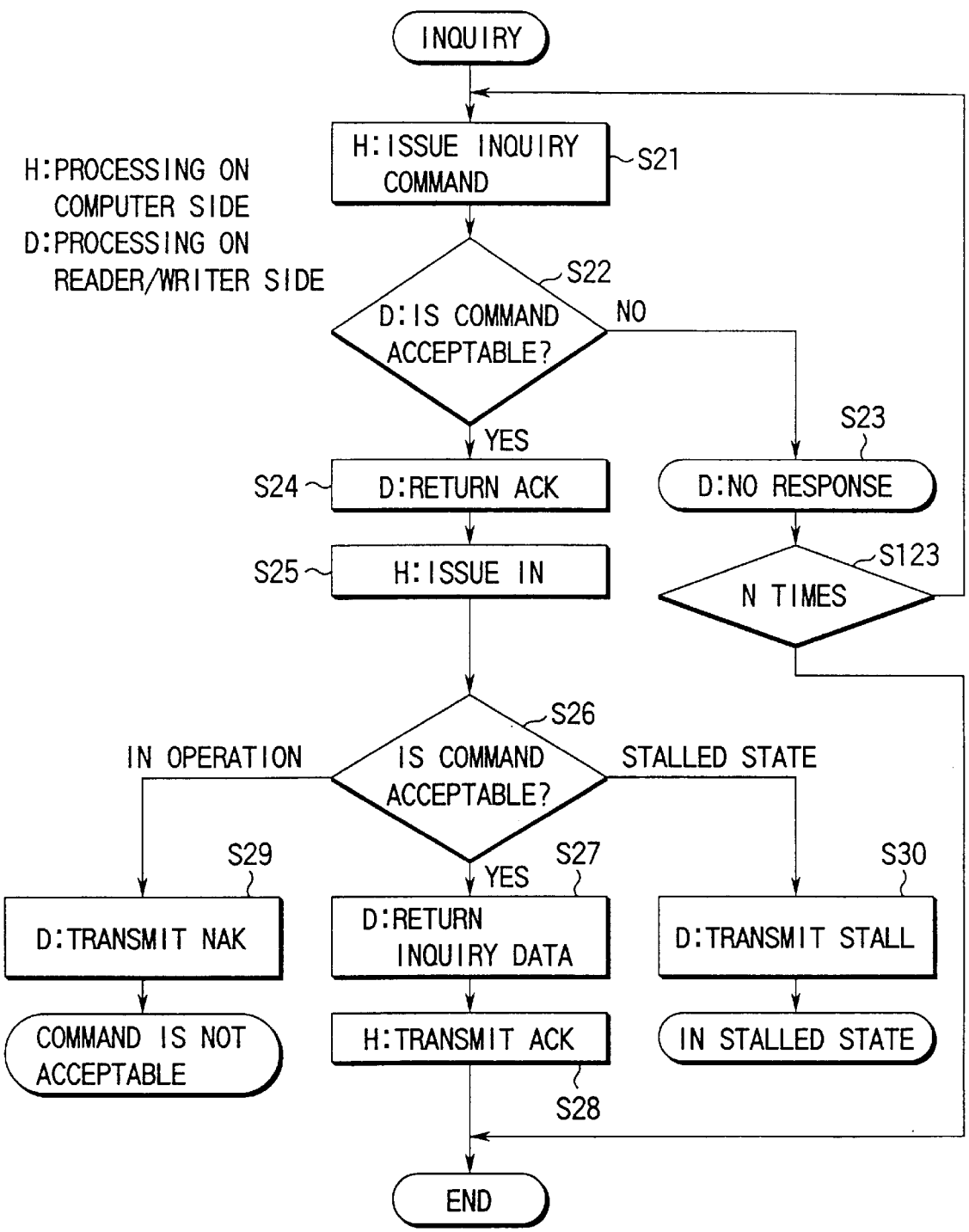
FIG. 5 is a flowchart for explaining the inquiry process.

This formatting operation is performed in compliance with an instruction from the operator, for example. First, the operator opens the window of the device driver and instructs the memory card 13 to be formatted by way of an input unit like a keyboard or a mouse. In response to this instruction, the device driver issues a formatting command as shown in FIG. 4 (step S11). This formatting command is based on the USB standard.

This formatting command is transmitted to the conversion controller 122 through the USB terminal of the computer 11, the cable 14 and the USB interface 121.

The conversion controller 122, if unable to accept the formatting command for some reason, for example, because other process is under execution, ignores and fails to respond to the particular command (steps S12, S13). In this case, if the formatting command, after N transmissions, or after three trials, for example, fails to be accepted, then the process is terminated (step S18).

The conversion controller 122, on the other hand, if capable of accepting the formatting command, transmits an ACK (acknowledge) signal to the computer 1 (steps S12, S14).

The conversion controller 122 determines that the received command is a formatting command, reads the program module for defining the processing of the formatting command based on the USB standard out of the ROM 123, and executes the formatting process in accordance with the program (step S15).

In this formatting process, the conversion controller 122 issues a FLASH READ command to the ATA controller 124. The ATA controller 124 executes the FLASH READ command and detects a stalled block. Then, the ATA controller 124 issues a BLOCK ERASE command to erase all the blocks other than the stalled block. The ATA controller 124 thus issues a FLASH WRITE command and writes the initialization data such as CIS (Card Information Structure).

Upon normal completion of formatting, the ATA controller 124 transmits a normal termination signal to the conversion controller 122. In response to the normal termination signal, the conversion controller 122 outputs a normal termination signal based on the USB standard to the computer 11 (step S16). In response to the normal termination signal, the device driver on the computer 11 notifies the operator of the termination of the formatting or otherwise performs a predetermined process.

In the case where the formatting of the memory card 13 fails to be terminated normally for some reason or other, on the other hand, the ATA controller 124 transmits an abnormal termination signal to the conversion controller 122. In response to the abnormal termination signal, the conversion controller 122 outputs an abnormal termination signal based on the USB standard to the computer 11 while at the same time entering a stalled state (step S17). In this stalled state, the main bus is closed, and the conversion controller 122 responds only a stall to the commands other than a set-up packet. In the case of a stall, the device driver of the computer 11 issues a REQUEST SENSE command described later, grasps the contents of the error, issues a CLEAR STALL command (clear feature) and restores the idle state from the stalled state.

The memory card 13 having a flash memory built therein may be formatted only at the time of issue of the memory card 13 but not by the reader/writer 12. In such a case, the conversion controller 122, upon receipt of a FORMAT command from the computer 11, returns an ACK signal to the computer 11. After that, however, the conversion controller 122 performs no special formatting operation.
(Acquisition of device information)

In the case where the computer system accesses the memory card 13, it is necessary to identify the external storage (device type, ISO version, response data format, product ID, etc.). In such a case, the system executes the process shown in FIG. 5. First, the device driver issues an INQUIRY command (step S21). This command is a serial command based on the USB standard.

This INQUIRY command is outputted through the USB interface (serial interface) of the computer 11, and transmitted through the USB interface 121 to the conversion controller 122.

The conversion controller 122, if unable to accept the INQUIRY command for some reason, ignores the command and fails to respond (steps S22, S23). In such a case, unless the formatting command is accepted after N transmissions thereof, or after three trials, for example, then the process is terminated (step S123).

The conversion controller 122, if able to accept the INQUIRY command, on the other hand, transmits the ACK signal to the computer 11 (steps S22, S24). Also, the conversion controller 122 acquires such information stored in the ROM 123 in advance as the device type of the external storage, the ISO version, the ECMA version, the ANSI version, the response data format, the additional data length, the vendor ID, the product ID and the product version.

In response to the ACK signal, the device driver on the computer 11 issues an IN command for requesting the data acquisition (step S25). This IN command is transmitted through the USB I/F 121 to the conversion controller 122.

The conversion controller 122, when capable of executing the IN command, transmits the device information acquired at step S24 to the computer 11 (steps S26, S27). The device driver on the computer 11, upon receipt of the INQUIRY data, transmits the ACK signal to the conversion controller 122 (step S28), and thus terminates the processing of the inquiry.

From the data thus supplied, the device driver acquires such information as the device type of the memory card 13, the ISO version, the ECMA version, the ANSI version, the response data format, the additional data length, the vendor ID, the product ID and the product version. These information are used for accessing the memory card 13 subsequently.

The conversion controller 122, while unable to execute the IN command issued by the computer 11 as other process is under execution, transmits a NAK signal to the computer 11 and notifies that the particular command cannot be executed (steps S26, S29).

In the case where the normal communication is impossible between the computer 11 and the conversion controller 122 for some reason, the stall signal based on the USB standard is issued while at the same time setting the system in the stalled state (steps S26, S30).
(Read process)

Figure 6:
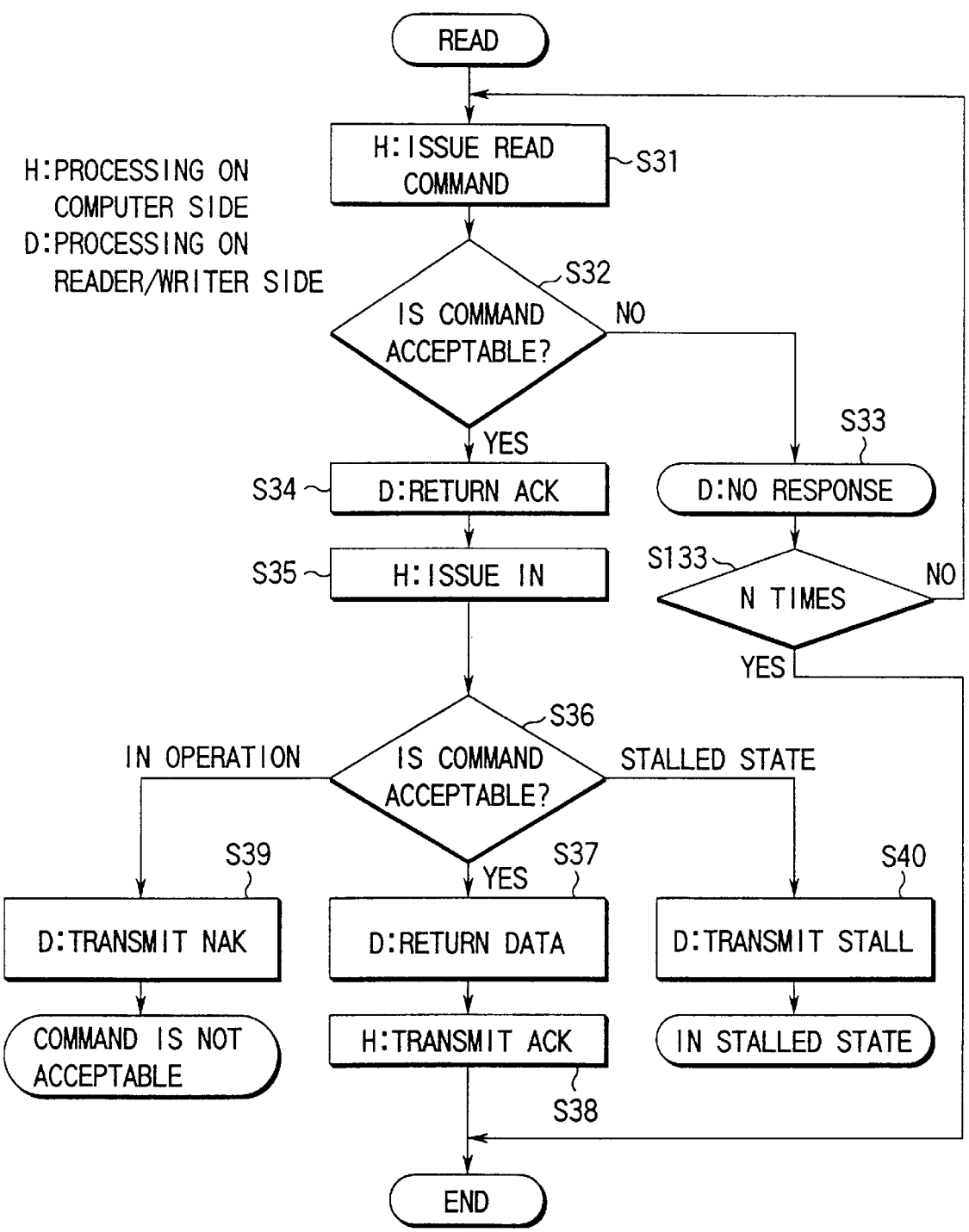
FIG. 6 is a flowchart for explaining the read process.

Now, the process of reading the data stored in the memory card 13 will be explained with reference to FIG. 6. In this case, the device driver issues a READ command in response to a request from an application program or the OS (step S31). This command includes the address, the byte length (number of bytes) and the amount of the data and is based on the USB standard.

This READ command is transmitted through the USB I/F 121 to the conversion controller 122.

The conversion controller 122, if unable to accept this READ command for some reason, ignores the command and fails to respond to it (steps S32, S33). In such a case, unless the formatting command is accepted after N transmissions, or after three trials, for example, then the process is terminated (step S133).

The conversion controller 122, if able to accept the READ command, on the other hand, transmits the ACK signal to the computer 11 (steps S32, S34).

Also, the conversion controller 122 reads from the ROM 123 a program module defining the process of converting the READ command based on the USB standard to the READ command based on the ATA standard, and in accordance with this program, converts the READ command based on the USB standard into the READ command based on the ATA standard and supplies the resulting command to the ATA controller 124 in parallel.

In response to the READ command thus converted, the ATA controller 124 reads the data stored in the corresponding address of the memory card 13 by a specified length and supplies it to the conversion controller 122.

In response to the ACK signal from the conversion controller 22, the device driver issues an IN command for requesting data acquisition (step S35). This IN command is transmitted through the USB I/F 21 to the conversion controller 122.

The conversion controller 122, when capable of executing the IN command, reads from the ROM 123 a program module defining the process for converting the data based on the ATA standard to the data based on the USB standard. In accordance with this program, the conversion controller 122 converts the format of the data based on the ATA standard supplied from the ATA controller 124 into the format based on the USB standard and supplies it to the computer 11 (steps S36, S37). The device driver, upon receipt of the data, transmits the ACK signal to the conversion controller 122 (step S38) and thus terminates the read process.

The data acquired in this way are supplied to an application or the OS and used for appropriate processing.

In the case where the IN command issued by the computer 11 cannot be executed as another process is under execution, the conversion controller 122 transmits the NAK signal to the computer 11 and notifies that the particular command cannot be executed (steps S36, S39).

In the case where normal communication is impossible between the computer 11 and the conversion controller 122 for some reason or other, the STALL signal based on the USB standard is outputted while at the same time setting the system in stalled state (steps S39, S40).

(Write process)

Figure 7:
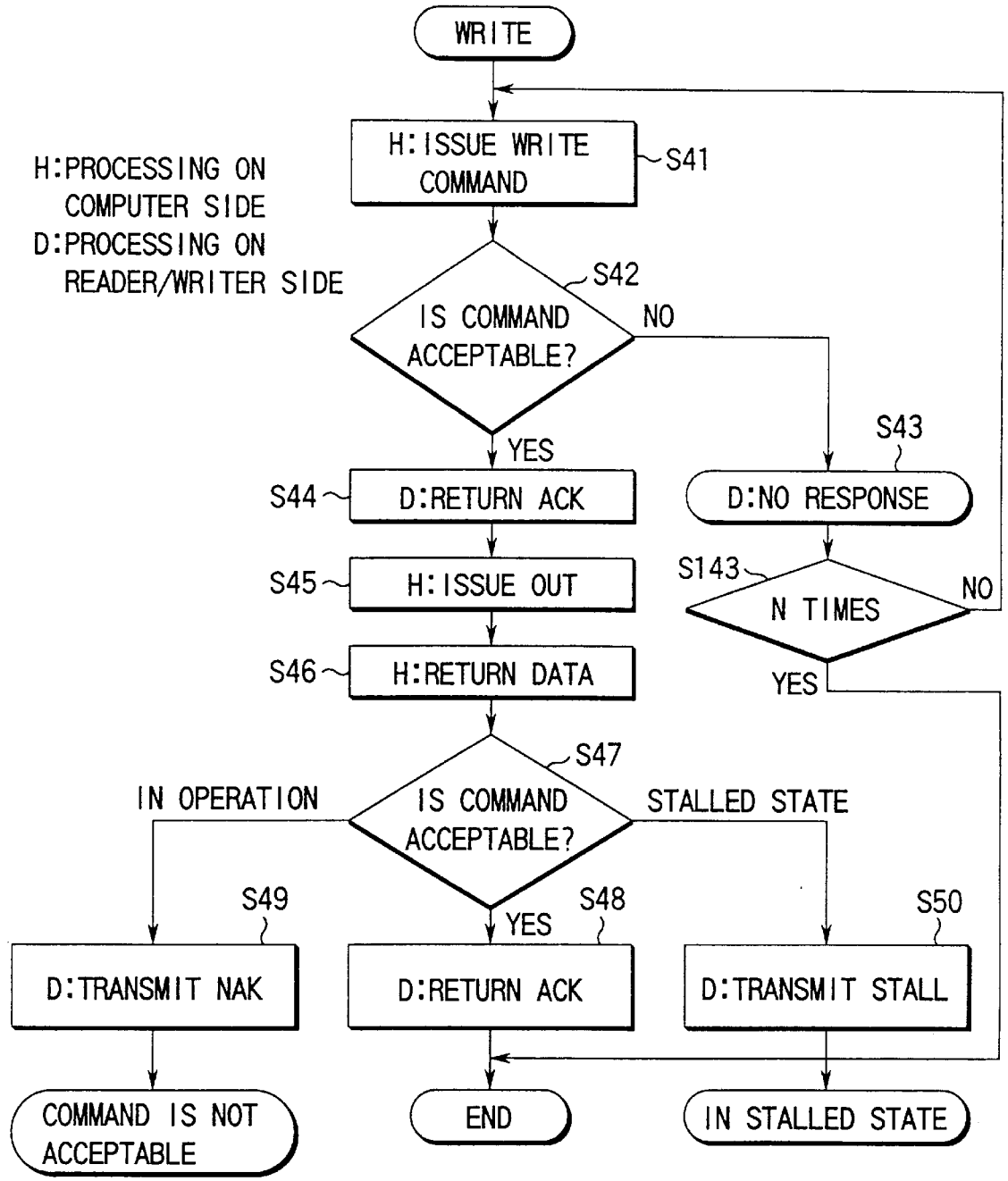
FIG. 7 is a flowchart for explaining the write process.

Now, the process for writing data in the memory card 13 will be explained with reference to FIG. 7.

In this case, in response to a request from an application program or the OS, the device driver issues a WRITE command (step S41). This command includes the data address, the byte length (number of bytes), etc. and is based on the USB standard.

This WRITE command is transmitted through the USB I/F and the USB IF 121 of the computer 11 to the conversion controller 122.

The conversion controller 122, if unable to accept the WRITE command, ignores the command and fails to respond to it (steps S42, S43). In this case, unless the formatting command is accepted after N transmissions, or after three trials, for example, the process is terminated (step S143).

The conversion controller 122, if ready to accept the WRITE command, transmits the ACK signal to the computer 11 (steps S42, S44).

Further, the conversion controller 122 reads from the ROM 123 a program module defining the process of converting the WRITE command based on the USB standard into the WRITE command based on ATA standard. In accordance with this program, the conversion controller 122 converts the WRITE command based on the USB standard supplied from the computer 11 into the WRITE command based on the ATA standard and transmits the resulting command to the ATA controller 124.

The ATA controller 124 waits for the receipt of data in response to the WRITE command based on the ATA standard.

On the other hand, the device driver issues an OUT command instructing a data output in response to the ACK signal from the conversion controller 122 (step S45).

Furthermore, the data to be written are transmitted to the conversion controller 122 (step S46).

The conversion controller 122, whenever capable of executing the OUT command (step S47), reads from the ROM 123 a program module defining the process for converting the format of the data based on the USB standard into the format based on the ATA standard. In accordance with this program, the conversion controller 122 converts the format of the data based on the USB standard supplied from the computer 11 into the format based on the ATA standard, and transmits the resulting data to the ATA controller 124.

The ATA controller 124, upon receipt of the data, writes the supplied data sequentially in the memory card 13. The ATA controller 124, upon completion of the data write operation, transmits a signal indicating the completion of the write operation to the conversion controller 122, which in turn transmits the ACK signal to the computer 11 (step S48), thereby terminating the write process.

On the other hand, the conversion controller 122, if unable to execute the OUT command issued by the computer 11 as another process is under execution, transmits the NAK signal to the computer 11 and notifies that the particular command cannot be executed (steps S47, S49).

In the case where normal communication fails between the computer 11 and the conversion controller 122 for some reason, the STALL signal based on the USB standard is outputted while at the same time setting the system in stalled state (steps S47, S50).

(State determination (sense) process)

Figure 8:
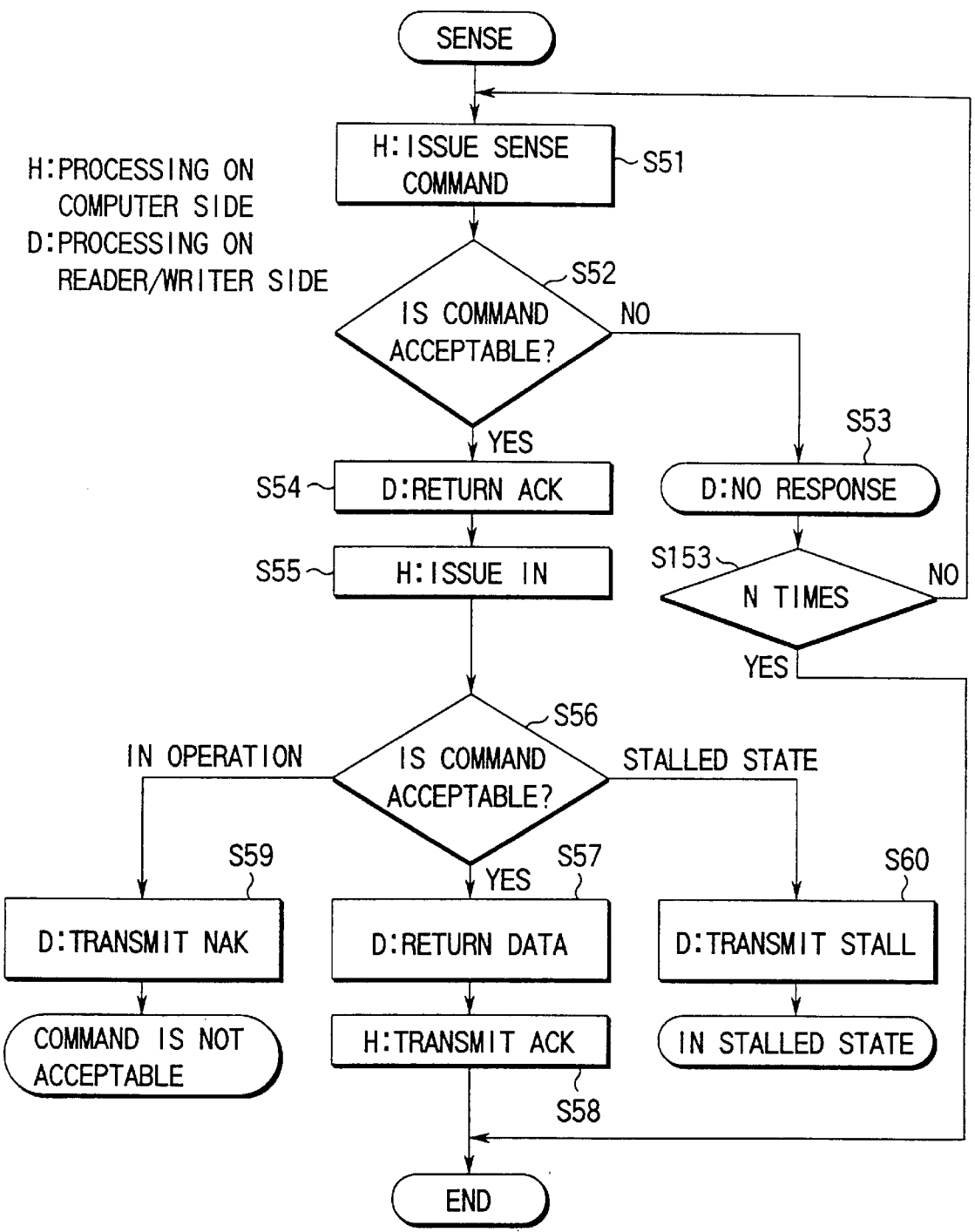
FIG. 8 is a flowchart for explaining the sense process.

Now, the sense process in which the device driver determines the state of the reader/writer 12 including the memory card 13 will be explained with reference to FIG. 8.

In this case, the device driver issues a SENSE command (step S51). The SENSE command is of two types, a MODE SENSE command for making an inquiry about the storage capacity of the memory card 13 and a REQUEST SENSE command for making an inquiry about the state of the system. The device driver issues one of them, as required. This command is based on the USB standard.

The command thus issued is transmitted to the conversion controller 122 through the USB interface and the USB interface 121 of the computer 11.

The conversion controller 122, if unable to accept the SENSE command, ignores it and fails to respond to it (steps S52, S53). In this case, unless the formatting command is accepted after N transmissions, or after three trials, for example, then the process is terminated (step S153).

The conversion controller 122, if ready to accept the SENSE command, on the other hand, transmits the ACK signal to the computer 11 (steps S52, S54).

Also, in the case where the SENSE command is the MODE SENSE command, the conversion controller 122 reads from the ROM 123 a program module defining the process for converting the MODE SENSE command based on the USB standard into the MODE SENSE command based on the ATA standard. In accordance with this program, the conversion controller 122 converts the MODE SENSE command based on the USB standard into an IDENTIFY DRIVE command based on the ATA standard, and supplies the resulting command to the ATA controller 124 in parallel.

The ATA controller 124 reads a list of parameters such as capacity stored at a predetermined position in the memory card 13 in response to the IDENTIFY DRIVER command thus converted, and supplies the data to the conversion controller 122.

The device driver, on the other hand, issues an IN command for requesting for acquisition of data in response to the ACK signal from the conversion controller 122 (step S55).

The conversion controller 122, when capable of executing the IN command, reads from the ROM 123 a program module defining the process for converting the data based on the ATA standard into the data based on the USB standard. In accordance with this program, the conversion controller 122 converts the format of the parameter list based on the ATA standard supplied from the ATA controller 124 into the format based on the USB standard and transmits the result to the computer 11 (steps S56, S57). The device driver, upon receipt of the data, transmits the ACK signal to the conversion controller 122 (step S58), and terminates the sense process. The data acquired in this way is supplied to an application or the OS and used for accessing the memory card 13.

In the case where the SENSE command is a REQUEST SENSE command, the conversion controller 122 reads from the ROM 123 a program module defining the process for converting the REQUEST SENSE command based on the USB standard into the IDENTIFY DRIVER command based on the ATA standard. In accordance with this program, the conversion controller 122 converts the REQUEST SENSE command based on the USB standard into the IDENTIFY DRIVER command based on the ATA standard, and supplies the resulting command in parallel to the ATA controller 124.

The conversion controller 122 and the ATA controller 124 check the various parts in the system and collect the sense key data indicating the state of each part. The contents of the data thus sensed include whether or not an error exists in the memory, whether or not the memory is accessible, whether or not there exists an irreparable error, whether or not there exists a hardware error, and whether or not the data are protected. The ATA controller 124 supplies the collected sense key data to the conversion controller 122.

In the case where the IN command issued by the computer 11 cannot be executed, on the other hand, the conversion controller 122 transmits the NAK signal to the computer 11 notifying that the particular command cannot be executed (steps S56, S59).

In the case where normal communication is impossible between the computer 11 and the conversion controller 122 for some reason, on the other had, the STALL signal based on the USB standard is outputted and the system is set in stalled state at the same time (steps S56, S60).

(Insertion and removal of memory card 13)

In order to make possible the plug and play function by the OS, the ATA controller 24 checks the insertion and removal of the connector 125 into and from the memory card 13 at regular time intervals. Each time of insertion and removal, the fact is identified. In the case where there is any inquiry from the computer 11 through the conversion controller 122, the result of identification is notified through the conversion controller 122 in interrupt transfer mode. The OS starts the plug and play process in response to this notification.

(Stall process)

Figure 9:
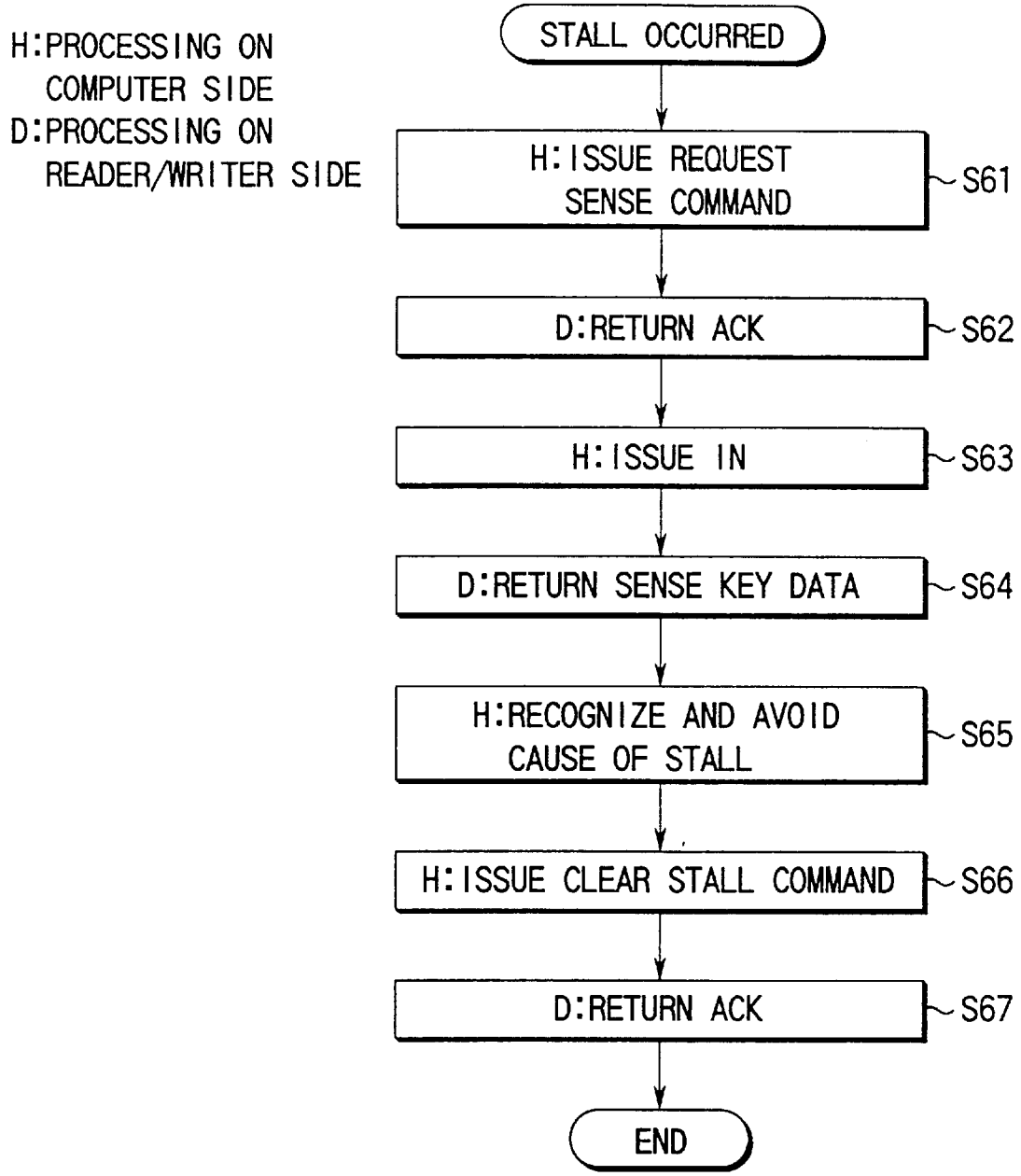
FIG. 9 is a flowchart for explaining the stall process.

Now, an explanation will be given of the process executed at the time when the communication path (cable) is stalled with reference to FIG. 9. In such a case, the driver issues a REQUEST SENSE command (step S61).

In response to the REQUEST SENSE command, the conversion controller 122 transmits the ACK signal to the computer 11 (step S62).

The conversion controller 122 and the ATA controller 124 check each part in the system and collect the sense key data indicating the state of each part. The computer 11, on the other hand, outputs an IN command in response to the ACK signal (step S63).

The conversion controller 122 transmits the sense key data collected at step S62 to the computer 11 in response to the IN command (step S64).

The device driver supplies the supplied sense key data to the OS and recognizes and avoids the cause of the stall (step S65). Further, the OS issues a CLEAR STALL command through the device driver (step S66). The conversion controller 122, upon receipt of the command, restores the idle state from the stalled state and transmits the ACK signal to the computer 11 (step S67). Then, normal communication is made possible between the computer 11 and the external memory device 12.

As described above, according to this embodiment, the external memory device can be accessed using a USB port constituting a serial input/output terminal of the computer 11. As a result, the connector size poses no problem even in the case where the computer is such a small-sized equipment as the palmtop computer, the PDA (personal data assistance), the digital still camera or the portable telephone.

Also, the USB command used by the computer and the ATA command used by the conventional external memory device are interchangeably converted to each other. Thus, the conventional storage medium based on the ATA standard can be used directly and the compatibility with the existing systems can be maintained. Further, the use of the USB interface permits a high-speed communication.

Second Embodiment

Figure 10:
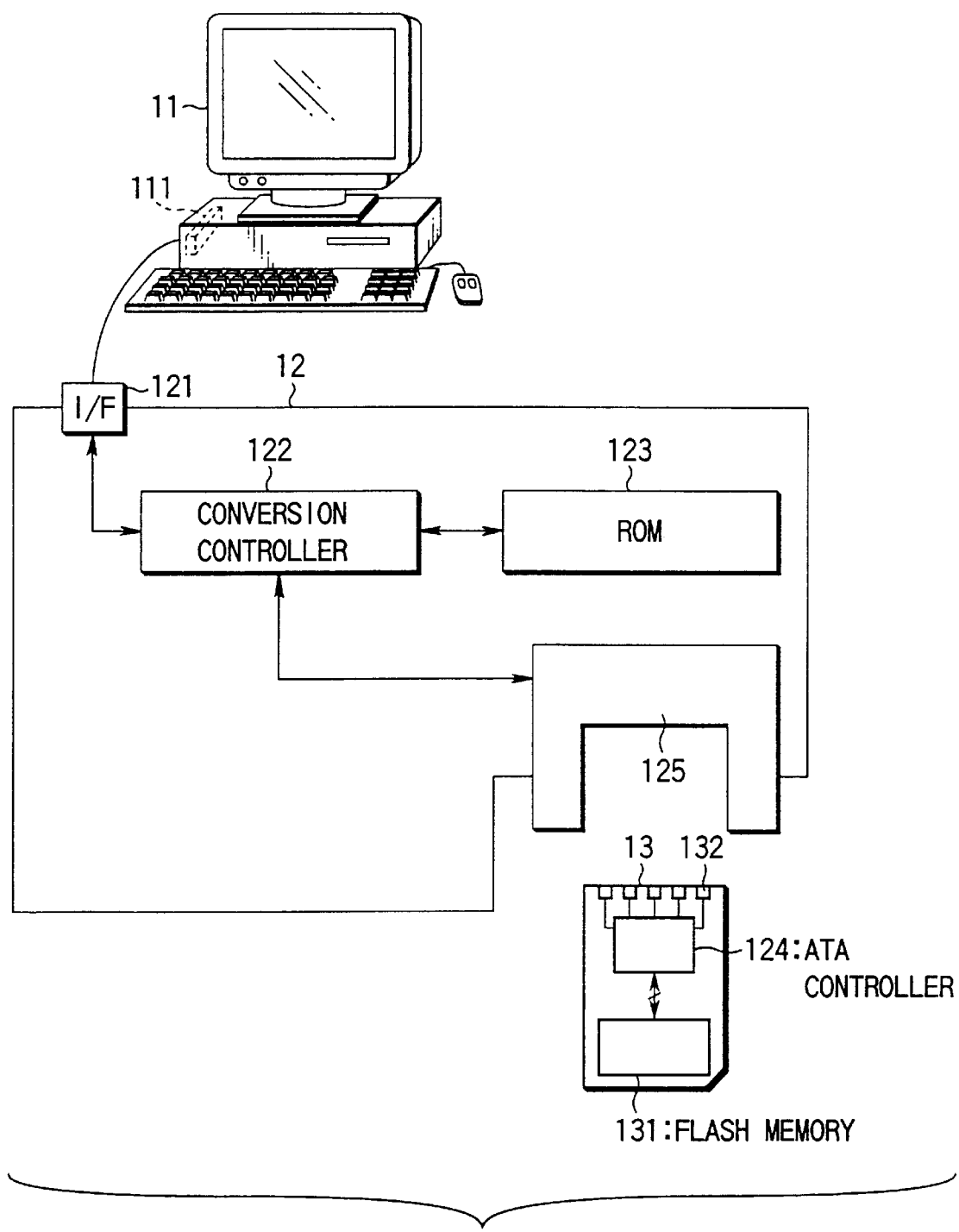
FIG. 10 is a block diagram showing a basic configuration of a computer system according to a second embodiment of the invention.

In the first and second embodiments, the ATA controller 124 for controlling the memory card 13 is arranged in the reader/writer 12. Alternatively, the ATA controller can be arranged in the memory card 13. A configuration of such an example is shown in FIG. 10. The operation of this example is identical to the operation of the first embodiment except that the communication between the conversion controller 22 and the ATA controller 124 (the communication based on the ATA standard) is established through the connector 125.

It is also possible to arrange the SCSI/F 127 and the selector 128 according to the second embodiment in such a manner that the output terminal of the selector 128 is connected to the ATA controller 124 in the memory card 13 through the connector 125.

Third Embodiment

The reader/writer 12 according to the first embodiment is used exclusively for the memory card 13 having no ATA controller built therein, and the reader/writer 12 according to the second embodiment is used exclusively for the memory card 13 with the ATA controller built therein. In place of them, a reader/writer that can be shared by either type of memory card can be provided.

Figure 11:
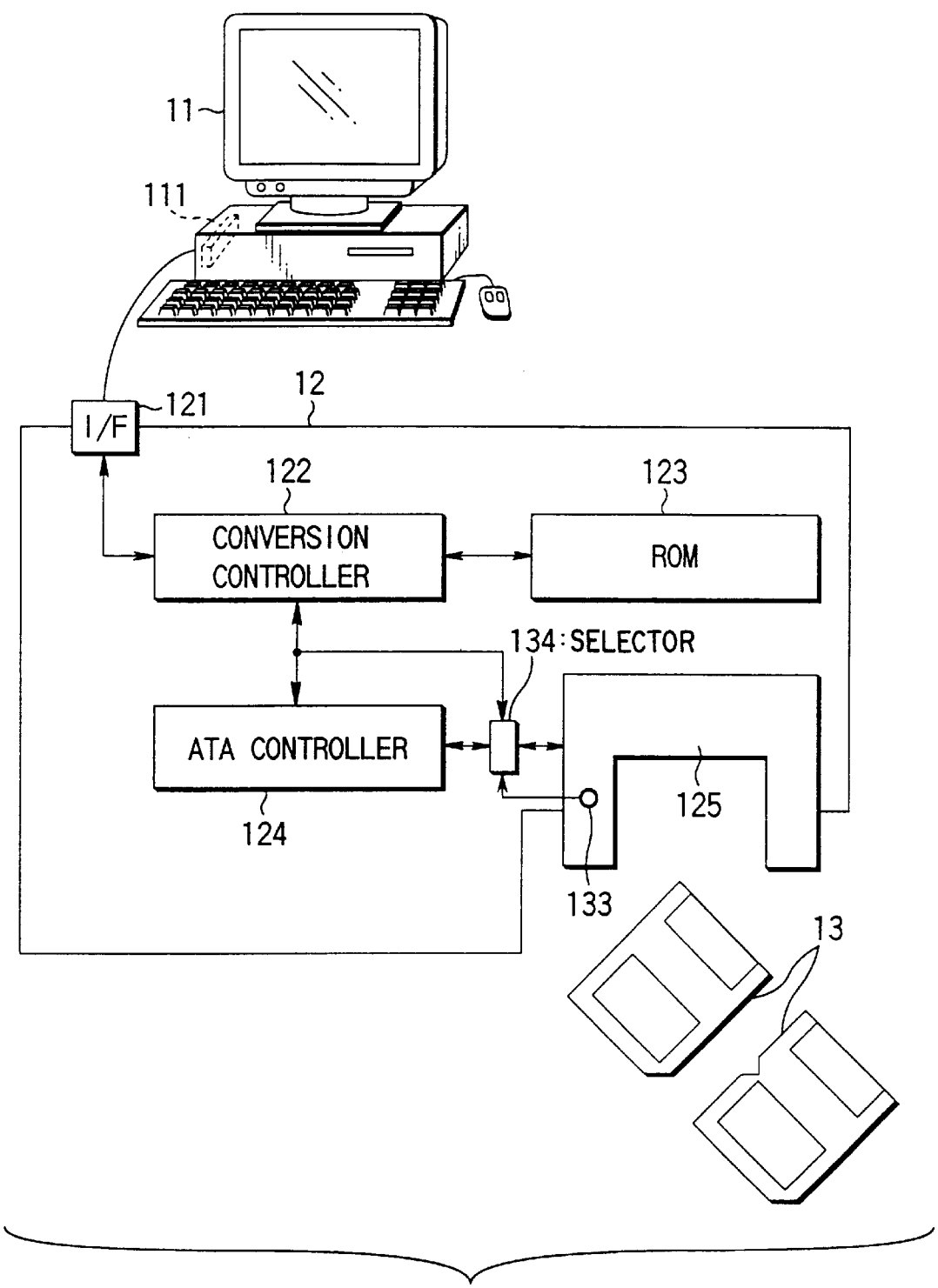
FIG. 11 is a block diagram showing a basic configuration of a computer system according to a third embodiment of the invention.

An example configuration of this type of reader/writer 12 is shown in FIG. 11. In this configuration, a sensor 133 determines the type of the memory card 13 which is mounted on the connector 125. In the case where the result of determination indicates that the memory card 13 includes no ATA controller, a selector 134 connects the ATA controller 124 and the connector 125. In the case where the memory card 13 includes the ATA controller, on the other hand, the selector 134 connects the conversion controller 122 and the connector 125.

With this configuration, the process can be executed in the reader/writer 12 regardless of the type of the memory card. The memory card 13 has formed therein the information indicating the type thereof by an opening or a notch. The sensor 133 includes an optical sensor or a microswitch.

Fourth Embodiment

In the first to third embodiments, the reader/writer 12 including only one memory card 13 and removed was explained. Instead, an arrangement is possible in which a plurality of memory cards 13 can be selectively mounted and removed.

Figure 12:
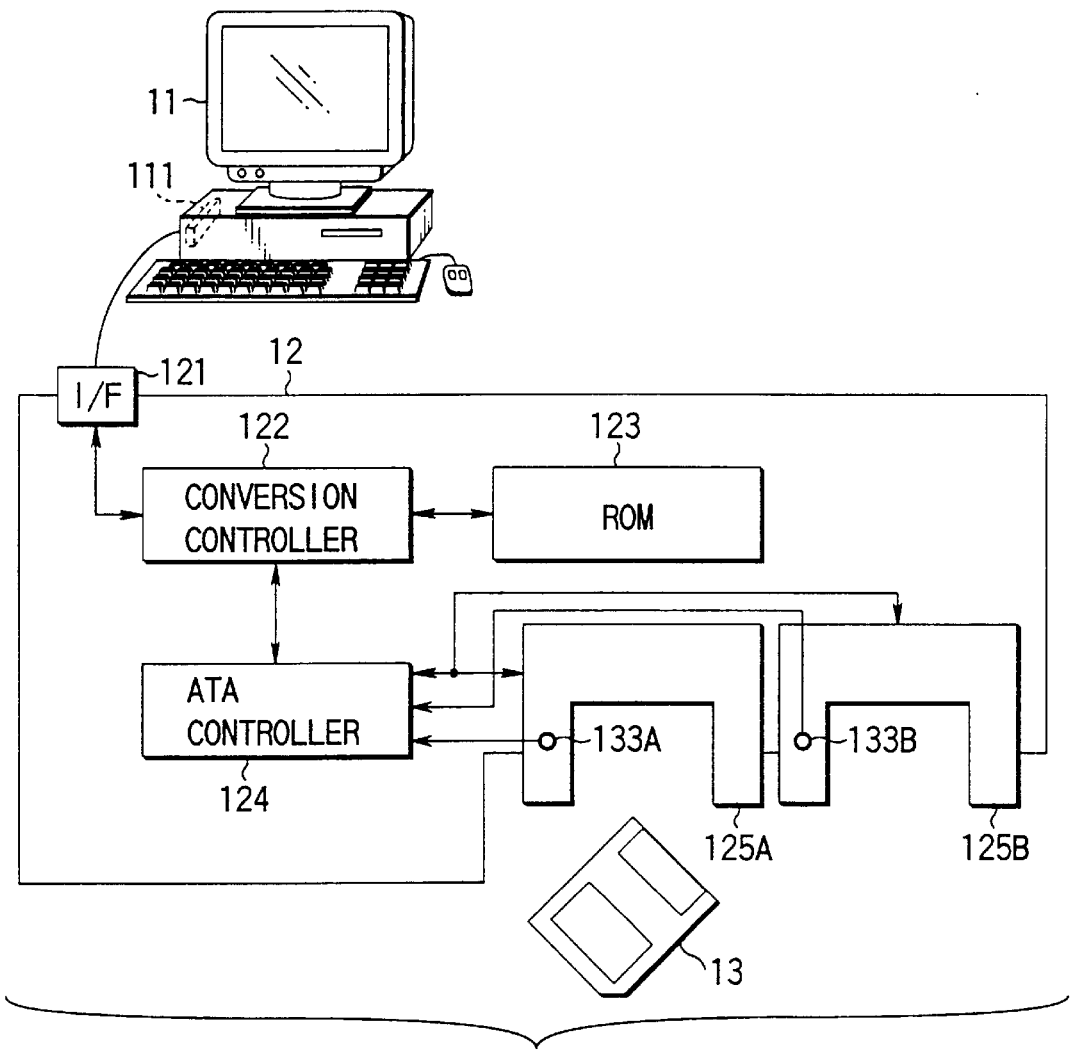
FIG. 12 is a block diagram showing a basic configuration of a computer system according to a fourth embodiment of the invention.

As shown in FIG. 12, the connector 125 includes a plurality of slots 125A, 125B. Each slot has sensors 133A, 133B arranged therein. The ATA controller 124 is supplied with a signal indicating a particular slot in which the memory card 13 is mounted. The conversion controller 122 makes an inquiry appropriately at the ATA controller 124 about the configuration of the system. The conversion controller 122, upon receipt of an INQUIRY command from the computer 11, notifies the computer 11 of the system configuration fetched in advance.

The computer 11 specifies and accesses the device (memory card 13), for example, based on the system configuration thus notified.

Also, a plurality of memory cards 13 containing the ATA controller 124 can be mounted.

Further, the memory card 13 having the ATA controller 124 built therein and the memory card 13 having no ATA controller 124 built therein can be configured as a common memory card. In such a case the sensors 133A, 133B determine which type of memory card is mounted in which slot and notifies the result to the computer 11. The computer 11 specifies the memory card 13 to be accessed, and issues a read/write command or the like. In the case where the designated memory card 13 has the controller 124 built therein, the conversion controller 122 supplies the ATA command directly to the particular memory card. The memory card 1 having no controller 124 built therein, if accessed, is done so through the ATA controller 124 arranged in the reader/writer 12.

Figure 13:
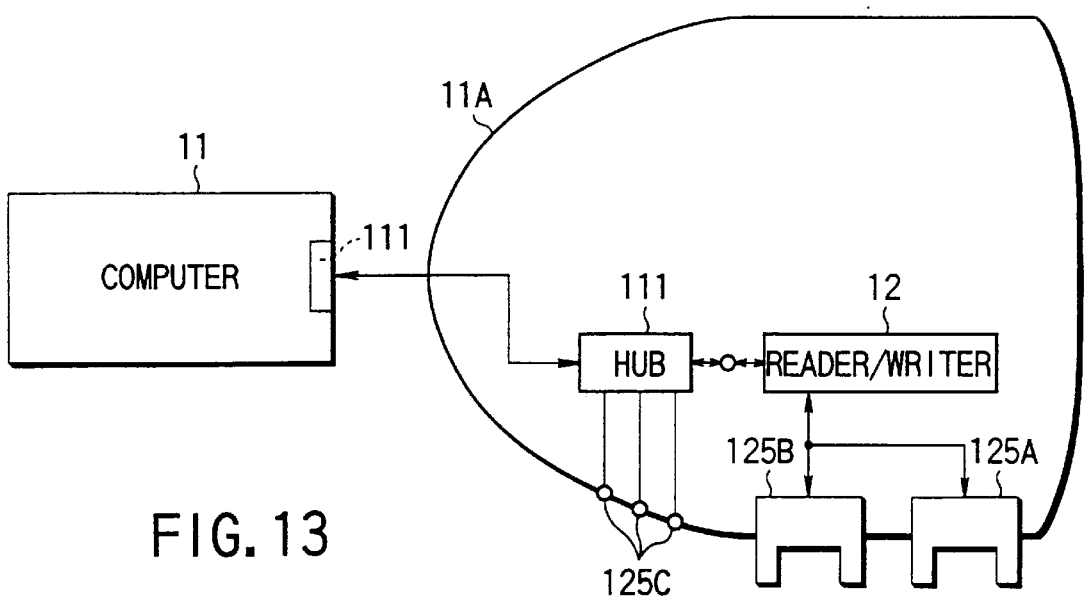
FIG. 13 is a block diagram showing an application of a computer system according to the invention.

The reader/writer 12 is not required to be connected to an exclusive USB terminal. As shown in FIG. 13, for example, a hub 111 connected to the USB terminals of the computer 11 is arranged in a housing of a display unit 11A such as a CRT, and a plurality of the USB terminals can be led out of the hub 111 with one of them connected to the reader/writer 12.

In the process, the slots 125A, 125B of one or a plurality of connectors 125 of the reader/writer 12 can be arranged at the front lower end or on the side of the display unit. The USB connection terminal 125C also can be arranged in similar fashion.

With this configuration, the memory can be very conveniently used by inserting and removing the memory card 13 into and from the slot formed in the CRT or the like. Especially, the handling is facilitated by supporting the plug and play function. Also, in the case where the storage medium is a flash memory, the magnetic field which may be generated by the CRT has no adverse effect and the contents of memory can be held in stable fashion.

The present invention is not confined to the above-mentioned embodiments, but various modifications and applications are possible. In the embodiments, for example, the reader/writer 12 is controlled by the device driver operating on the OS. However, the reader/writer 12 can alternatively be controlled by the OS itself.

Also, the above-mentioned embodiments refer to the case in which the commands and data based on the USB standard and the commands and data based on the ATA standard are converted from each other. In spite of this, the invention is applicable with equal effect to the case where different serial and parallel standards are converted to each other. Also, the present invention is not limited to the case in which the external memory device of the computer is controlled, but is widely applicable to the case in which the peripheral equipment of the computer are controlled.

The whole or part of the programs stored in the device driver and the ROM 123 may be distributed by being stored in a recording medium (floppy disk, CD-ROM, etc.), so that the programs may be installed on the computer 11 or stored in the ROM 123.

As described above, according to this invention, the dedicated area of the terminal of the computer or the like is minimized, and while maintaining the compatibility with the existing recording medium, data can be held and read out at high speed.

As described above, a computer system according to the present invention is not limited to the desktop computer or the note-sized personal computer but is applicable to computers in general for processing data by accessing an external memory device such as the PDA (personal data assistance), the palmtop computer, the digital still camera and the portable telephone.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:

a computer including a computer-side serial interface for issuing at least one command and data based on a serial communication standard through said computer-side serial interface;

a storage-side serial interface connected to said computer-side serial interface;

conversion means having a ROM storing a program m for receiving the at least one command and data based on said serial communication standard supplied through said computer-side serial interface and said storage-side serial interface and converting the at least one command and data into a corresponding at least one parallel command and data based on a parallel communication standard, said conversion means automatically converting the received at least one command and data based on said serial communication standard into the at least one parallel command and data based on the parallel communication standard in accordance with the program stored in said ROM; and an external storage having access means and including a removable storage medium, said access means controlling access to said removable storage medium in accordance with the at least one parallel command and data based on the parallel communication standard supplied from said conversion means.

2. A computer system according to claim 1, wherein said computer issues the at least one command based on a USB (Universal Serial Bus) serial communication standard, said conversion means converts a command based on said USB standard into at least one corresponding parallel command based on an ATA (AT Attachment) parallel communication standard.

3. A computer system according to claim 1, wherein said ROM stored program is a program for converting at least one command based on a USB (Universal Serial Bus) serial communication standard into at least one command based on an ATA (AT Attachment) parallel communication standard, said conversion means includes a conversion controller operating in accordance with the program stored in said ROM for converting the at least one command and data based on the USB standard into the at least one command and data based on the ATA standard, and said access means includes an ATA controller for controlling the access to said removable storage medium based on the ATA standard.

4. An external storage accessed by a computer, comprising:
   conversion means configured to be connectable to a serial communication terminal of the computer and including a ROM storing a program for receiving a first command and data based on a first standard supplied from said computer and converting the received command and data into a second command and data based on a second standard different from said first standard said conversion means automatically converting the first command and data into the second command and data under control of said program stored in said ROM; and
   access means for controlling access to a storage medium removably connected to said conversion means according to the second command and data supplied from said conversion means.

5. An external storage according to claim 4 wherein said first standard is a USB (Universal Serial Bus) standard and said second standard is an ATA (AT Attachment) standard.

6. An external storage according to claim 4 or 5, wherein said conversion means includes means for converting serial data of format based on the first standard and supplied serially from said computer into parallel data of format based on the second standard, said access means includes means for writing the data of the format based on said second standard into said storage medium in response to a write command based on said second standard supplied from said conversion means, said access means reads the data stored in said storage medium in response to a read command based on the second standard supplied from said conversion means and supplies the data to said conversion means in accordance with a format based on said second standard, and said conversion means includes means for converting the data supplied from said access means into serial data of format based on said first standard and supplying the data thus converted to said computer.

7. An external storage according to claim 4 or 5, wherein said conversion means includes means for sending a response to said computer without converting a command, which is included in commands supplied from the computer and which is capable of responding to the computer without using the access means, into a command based on the second standard, and for supplying a command, which is included in the commands supplied from the computer and required for accessing the storage medium by means of the access means, to the access means with said command being converted into a command based on the second standard.

8. An external storage according to claim 4 or 5, comprising mounting means for mounting said storage medium removably, wherein said access means accesses said storage medium mounted on said mounting means.

9. An external storage according to claim 8, wherein said mounting means includes a plurality of mounting members for selectively mounting a plurality of removable storage media.

10. An external storage according to claim 8, wherein said storage medium includes a flash memory, and said external storage functions substantially in similar fashion to a magnetic disk drive.

11. An external storage according to claim 4 or 5, comprising mounting means for mounting said storage medium removably, wherein said access means is arranged in said storage medium mounted on said mounting means.

12. An external storage according to claim 11, wherein said mounting means includes a plurality of mounting members for selectively mounting a plurality of removable storage media.

13. A converter system comprising:
   a first node based on a serial communication standard;
   a second node based on a parallel communication standard;
   conversion means for converting a command based on the serial communication standard supplied serially through said first node into a corresponding parallel command based on the parallel communication standard and outputting said parallel command to said second node in the case where said command based on said serial communication standard is a command requiring access to a system based on said parallel communication standard; and
   transmission means for transmitting through said first node a response to a command based on the serial communication standard supplied serially through said first node without converting said command into a command based on the parallel communication standard in the case where said command based on said serial communication standard is a command not requiring access to said system.

14. A converter system according to claim 13, wherein said serial communication standard is a USB (Universal Serial Bus) standard, said parallel communication standard is an ATA (AT Attachment) standard, and said system includes an external storage based on the ATA standard.

15. A converter system according to claim 13 or 14, wherein said conversion means includes means for converting the format of data based on said serial communication standard supplied through said first node into the data of the format based on said parallel communication standard and outputting said data to said second node, and means for converting data of the format based on said parallel communication standard supplied through said second node into data of the format based on said serial communication standard and outputting said data to said first node.

16. A converter system according to claim 13 or 14, wherein said first node is connected to a serial communication terminal based on said serial communication standard of a computer, and said second node is connected to access means for accessing a storage medium based on a command supplied from said conversion means.

17. A converter system according to claim 16, wherein said second node is fixedly connected to said access means, and said access means is connected to means for accessing a removably-mounted storage medium.

18. A converter system according to claim 16, wherein said second node is removably connected to said access means, and said access means accesses said storage medium while being connected to said second node.

19. A converter system according to claim 13 or 14, wherein said conversion means and said transmission means include a memory for storing a program for converting a command based on the USB (Universal Serial Bus) standard into a command based on the ATA (AT Attachment) standard and a program for responding to a command based on the USB standard, and a processor for receiving a command supplied through said first node and executing a program corresponding to said received command thereby to convert a command or respond to a command.

20. A recording medium for storing a program including an instruction for instructing a processor to convert a command based on a USB (Universal Serial Bus) standard into a command based on an ATA (AT Attachment) standard, an instruction for instructing the processor to respond to a command based on the USB standard, an instruction for instructing the processor to convert data of a format based on the USB standard into data of a format based on the ATA standard, an instruction for instructing the processor to convert data of the format based on the ATA standard into data of the format based on the USB standard.

* * * * *